Patented Sept. 13, 1932

1,877,315

UNITED STATES PATENT OFFICE

RICHARD HERZ, OF FRANKFORT-ON-THE-MAIN, AND WERNER ZERWECK, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

BROMINATED VAT DYESTUFFS OF THE ANTHANTHRONE SERIES AND PROCESS OF MAKING SAME

No Drawing. Original application filed November 1, 1926, Serial No. 145,697, and in Germany November 7, 1925. Divided and this application filed December 11, 1929. Serial No. 413,319½.

This application is a division of our copending application Serial No. 145,697, filed November 1, 1926, which has matured into Pat. No. 1,803,757.

We have found that valuable vat dyestuffs of the anthanthrone series are obtainable by causing a halogenating agent to act upon anthanthrone in the presence of an inorganic diluent selected from the group consisting of: concentrated sulfuric acid, sulfuric acid monohydrate, fuming sulfuric acid, chlorosulfonic acid, sulfuryl chloride, sulfur chlorides, thionyl chloride. The reaction can be carried out at ordinary or a elevated temperatures preferably below 100° C.

As suitable halogenating agents there may be used: bromine, chlorine gas, and for chlorinating also those compounds which evolve chlorine during the reaction as, for instance, sulfuryl chloride, antimony pentachloride, sulfur chlorides, alkali hypochlorites in the presence of an inorganic acid, and alkali chlorates in the presence of hydrochloric acid.

According to our new process, one or more chlorine atoms may be introduced into the anthanthrone molecule by passing, while stirring, for instance, chlorine into finely ground anthanthrone in the presence of an inorganic diluent as before stated, to which a small amount of iodine, ferric chloride, antimony pentachloride, iodine-trichloride or a similar compound may be added as a halogen carrier.

In a similar manner bromine may be introduced into the anthanthrone molecule by mixing finely powdered anthanthrone with bromine in the presence of an inorganic diluent as before stated, and stirring the mixture for some hours at ordinary or elevated temperatures below 100° C.

The most valuable products are obtained when the halogenation is carried out in such a way that approximately two atoms of halogen enter into the molecule of the anthanthrone.

The new dyestuffs, corresponding probably to the general formula:

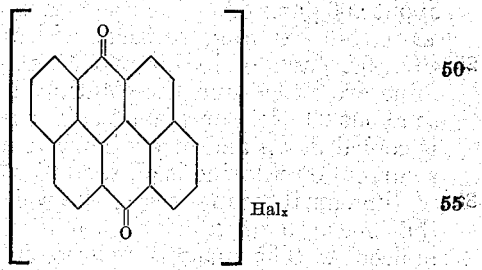

wherein $x$ is approximately the number 2 and Hal stands for chlorine, bromine, or chlorine+bromine, are when dry yellow to orange to red powders, difficultly soluble in organic solvents of a higher boiling point, easily soluble in concentrated sulfuric acid with a brilliant green color, forming with alkaline hydrosulfite violet colored vats, from which vegetable fibers are dyed yellowish-orange to reddish shades of exceptional brightness and excellent fastness, particularly to light.

They surpass herein all orange vat dyestuffs hitherto known.

In order to further illustrate our invention, the following examples are given, the parts being by weight and all temperatures in centigrade degrees, but it is understood that our invention is not limited to the particular products or reaction conditions mentioned therein:

Example 1

15 parts of anthanthrone are dissolved in about 200 parts of chlorosulfonic acid at ordinary temperature. The mass is cooled, 0.2 parts of iodine are added and 16 to 20 parts of chlorine are allowed to pass in until the increase of the weight shows that two atoms of chlorine have entered into the molecule. The temperature during the reaction should preferably not rise above 15°. After standing for some hours, the mass is poured on ice, and the separated dyestuff is filtered and dried. The new dyestuff, thus obtained, having probably the formula:

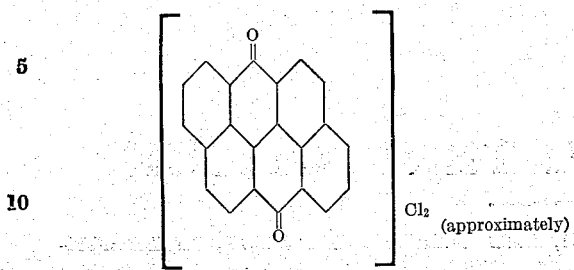

is when dry an orange-red powder, soluble in concentrated sulfuric acid with a pure green color. It dyes vegetable fibers from a violet vat violet shades, turning to a brilliant yellowish orange of excellent fastness when exposing the dyed goods to the air or soaping it.

*Example 2*

22 parts of anthanthrone are dissolved in about 200 parts of sulfuric acid monohydrate, 42 parts of fuming sulfuric acid of 65% of $SO_3$, 0.2 parts of iodine and 6 parts of bromine are added and the solution is warmed to about 60° for some hours. Then the mass is cooled down and at ordinary temperature a current of chlorine is allowed to pass, while cooling, until the increase of the weight shows that one atom of chlorine has entered into the molecule. The mass is poured on ice; the orange-red colored precipitate is filtered.

The dyestuff, thus obtained, having probably the formula:

$$\left[ \text{(anthanthrone structure)} \right] Cl_x + Br_y$$

in which formula X is approximately the number 1, which is when dry an orange powder, difficultly soluble in organic solvents of a higher boiling point, easily soluble in concentrated sulfuric acid with a pure green color, and dyeing vegetable fibers from a violet vat orange shades of exceptional brightness and excellent fastness.

*Example 3*

3 parts of anthanthrone are dissolved in about 100 parts of sulfuric acid of 66° Bé., then 0.1 parts of iodine and 3 to 6 parts of bromine are added and the mass is warmed at about 50 to 100° for some hours. When the reaction is finished, the mass is poured on ice, the precipitated dyestuff is filtered, washed, and any adherent excess of bromine is removed in the usual manner when necessary. The new dyestuff, thus obtained, is when dry a red powder, soluble in concentrated sulfuric acid with a pure green color. It forms with alkaline hydro-sulfite a violet vat from which vegetable fibers are dyed the same shades, turning to a brilliant reddish-orange of an excellent fastness by exposing the dyed goods to the air or by soaping it.

*Example 4*

22 parts of anthanthrone are dissolved in about 200 parts of sulfuric acid monohydrate. Then 40 parts of fuming sulfuric acid (containing 65% of $SO_3$), 0.2 parts of iodine and 12 parts of bromine are added and the mass is warmed to about 60° for some hours, until the bromine is absorbed. This method of brominating is particularly advantageous, because it requires for introducing one molecule of bromine only one molecule of bromine as the hydrobromic acid, formed by the reaction, is directly reoxidized to bromine by the $SO_3$ of the fuming sulfuric acid present.

The mass of reaction is worked up as described in the foregoing example. The dyestuff, thus obtained, has similar tinctorial properties to the dyestuff described in the foregoing examples.

This process can advantageously be combined with the production of anthanthrone itself. In this case one works, for instance, as follows:

25 parts of 1.1-dinaphthyl-8.8'-dicarboxylic acid (see U. S. application Serial No. 118,081, Pat. No. 1,684,272) are slowly introduced into about 200 parts of sulfuric acid monohydrate. Care should be taken that the temperature does not rise much above 60°. Thereby, anthanthrone is formed in a quantitative yield. Then the bromination of the formed anthanthrone is carried out as described above.

We claim:

1. The process which comprises reacting upon anthanthrone with bromine in the presence of sulfuric acid monohydrate and of a small amount of iodine, with the addition of fuming sulfuric acid so that the hydrobromic acid evolved during the bromination is directly reoxidized to bromine and consequently for introducing approximately two atoms of bromine approximately one molecule of bromine is required, at a temperature of about 60°, until approximately two bromine atoms have been introduced into the anthanthrone molecule.

2. The process which comprises reacting upon 22 parts of anthanthrone dissolved in about 200 parts of sulfuric acid monohydrate with 12 parts of bromine mixed with about 40 parts of fuming sulfuric acid and 0.2 parts of iodine, at a temperature of about 60° until the bromine is absorbed.

3. As new compounds, vat dyestuffs corresponding probably to the formula:

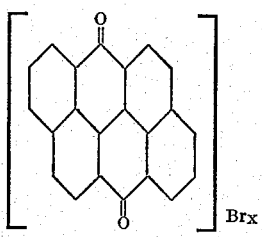

in which formula X is approximately the number 2, which dyestuffs are when dry red powders, difficultly soluble in organic solvents of a higher boiling joint, easily soluble in concentrated sulfuric acid with a pure green color, and dyeing vegetable fibers from a violet vat reddish-orange shades of exceptional brightness and excellent fastness, particularly to light.

In testimony whereof we affix our signatures.

RICHARD HERZ.
WERNER ZERWECK.